United States Patent [19]

Hallstrom

[11] 4,143,760

[45] Mar. 13, 1979

[54] RECIPROCATING CONVEYOR

[76] Inventor: Olof A. Hallstrom, 1350 Hallstrom Rd., Tillamook, Oreg. 97141

[21] Appl. No.: 707,877

[22] Filed: Jul. 22, 1976

Related U.S. Application Data

[63] Continuation of Ser. No. 540,281, Jan. 10, 1975, abandoned.

[51] Int. Cl.² .............................................. B65G 25/04

[52] U.S. Cl. .................................... 198/750; 198/775

[58] Field of Search ........................ 198/750, 773-775; 214/83.3, 83.24

[56] References Cited

U.S. PATENT DOCUMENTS

| | | | |
|---|---|---|---|
| 2,629,504 | 2/1953 | Peterson | 198/750 |
| 2,973,856 | 3/1961 | Brooks | 198/773 |
| 3,292,799 | 12/1966 | Eggleston et al. | 198/775 |
| 3,534,875 | 10/1970 | Hallstrom | 198/750 |

*Primary Examiner*—Robert B. Reeves
*Assistant Examiner*—Jeffrey V. Nase
*Attorney, Agent, or Firm*—Oliver D. Olson

[57] ABSTRACT

At least one group of at least three elongated slats are mounted side-by-side on a frame for longitudinal reciprocation to form a conveyor, the slats being connected to a fluid pressure drive mechanism which is operable to move all of the slats of each group from a start position simultaneously in a load-conveying direction and then to move the slats of each group sequentially in the opposite direction from the advanced position back to the start position, the slats of each group being interengaged releasably in the conveying direction to insure simultaneous movement.

4 Claims, 5 Drawing Figures

RECIPROCATING CONVEYOR

This is a continuation of application Ser. No. 540,281, filed Jan. 10, 1975, now abandoned.

BACKGROUND OF THE INVENTION

This invention relates to reciprocating conveyors, and more particularly to a novel fluid pressure drive system for reciprocating conveyors of the slat type.

Reciprocating slat type conveyors provided heretofore generally utilize groups of two slats with the slats of each group moving vertically and horizontally relative to each other, or with the slats of each group moving simultaneously in one direction and sequentially in the opposite direction. For many types of materials, this operation results in a step-wise advance of the material followed by partial retraction of the material. Thus, the arrangement is wasteful of conveyor drive power and is slow and inefficient in operation.

The foregoing disadvantages are overcome by the reciprocation conveyor described in my earlier U.S. Pat. No. 3,534,875 and in my earlier filed pending application Ser. No. 496,523 filed Aug. 12 1974. However, both of my earlier conveyors involve the provision of special and therefore costly drive components.

SUMMARY OF THE INVENTION

In its basic concept, this invention provides a slat type reciprocating conveyor formed of at least one group of at least three elongated slats and in which a fluid pressure drive system operates to move all of the slats simultaneously from a start position in the desired conveying direction and then to move the slats of the group sequentially in the opposite direction from the advanced position back to the start position.

It is by virtue of the foregoing basic concept that the principal objective of this invention is achieved; namely, to overcome the aforementioned limitations and disadvantages of prior reciprocating slat-type conveyors.

Another important object of this invention is to provide a reciprocating conveyor of the class described in which the fluid pressure drive system is formed of commercially available components and therefore is of minimum cost.

Still another important object of this invention is the provision of a reciprocating conveyor of the class described which may be utilized in industrial conveyor applications as well as providing a truck bed capable of operation to load material onto the truck and to unload material from the truck.

The foregoing and other objects and advantages of this invention will appear from the following detailed description, taken in connection with the accompanying drawings of preferred embodiments.

DESCRIPTION OF THE PREFERRED EMBODIMENTS

Figure 1:
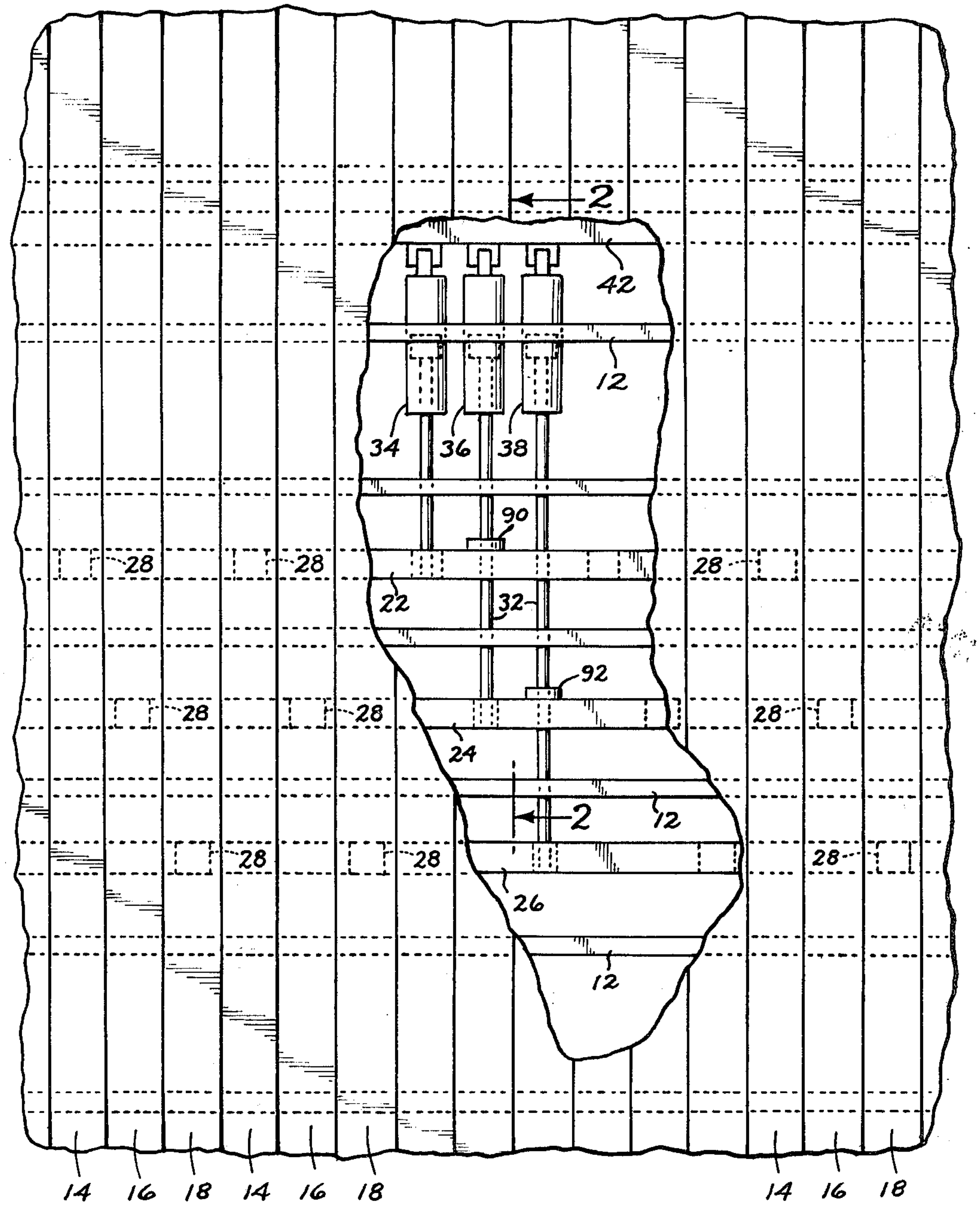
FIG. 1 is a fragmentary plan view of a recirpocating slat type conveyor embodying the features of this invention a portion being broken away to disclose details of construction.

As previously indicated, the reciprocation conveyor of this invention can be utilized per se in a variety of industrial applications, such as elongated delivery conveyors. It may also form the load supporting bed of a truck. In any event, the conveyor is supported by a framework which includes laterally spaced side beams 10 interconnected by transverse beams 12.

The conveyor comprises at least one group of at least three elongated slats which extend longitudinally of the framework in the direction of conveying movement, and which are arranged side-by-side transversely of the framework. There are a plurality of such groups in the embodiment illustrated, each group consisting of three slats 14, 16 and 18, although it is to be understood that each group may include any desired number in excess of two.

Supported by the transverse frame beams 12 and extending longitudinally of the framework are a plurality of laterally spaced guide beams 20. They are secured to the transverse beams 12, as by welding. Each of the elongated conveyor slats is mounted on a guide beam 20 for longitudinal reciprocation relative thereto. This mounting may be provided by the structural arrangement described in detail in my co-pending application identified hereinbefore, in order to minimize frictional resistance to said reciprocation.

In accordance with this invention, fluid pressure drive mechanism is provided for reciprocating the slats for each group simultaneously from a start position in a load conveying direction and then to move the slats of each group sequentially in the opposite direction from the advanced position back to the start position. This mode of operation insures efficient movement of all types of loads in a desired conveying direction.

Figure 2:
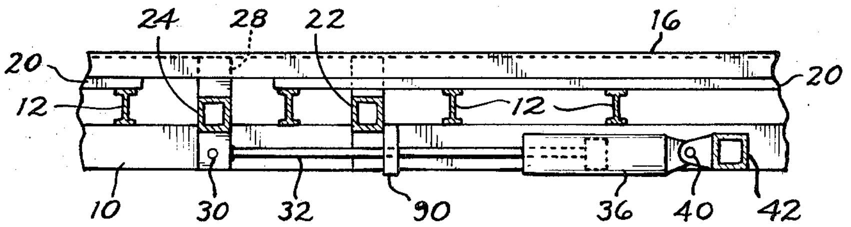
FIG. 2 is a fragmentary sectional view taken along line 2—2 in FIG. 1.

In the embodiment illustrated, one slat of each group is interconnected for simultaneous longitudinal reciprocation. For this purpose, three transverse drive beams 22, 24 and 26 underlie the slats intermediate certain of the transverse frame beams 12 between which portions of the longitudinal guide beams 20 have been cut away (FIG. 2). Each drive beam is provided with a plurality of laterally spaced brackets 28 which extend upward through the cut-away portions of the guide beams 20 for attachment to the associated slats. In the embodiment illustrated, a plurality of said brackets 28 on drive beam 22 secure all of the slats 14 of the plurality of groups together; a plurality of said brackets 28 on drive beam 24 secure all of the slats 16 together; and a plurality of said brackets 28 on drive beam 26 secure all of the slats 18 together.

Each of the transverse drive beams is connected to a source of fluid pressure power for reciprocative movement in the longitudinal direction of the conveyor. In the embodiment illustrated, drive beams 22, 24 and 26 ae connected pivotally, as by pivot pins 30, to the projecting ends of piston rods 32 extending from fluid pressure cylinders 34, 36 and 38, respectively. The ends of the cylinders opposite the piston rods are mounted pivotally, as by pivot pins 40, to a transverse frame member 42 secured at its opposite ends to the side beams 10 of the framework.

The inner ends of the piston rods 32 are connected to pistons which are reciprocative in the cylinders upon application of fluid pressure, preferably hydraulic, selectively to the opposite ends of the cylinders.

Figure 3:
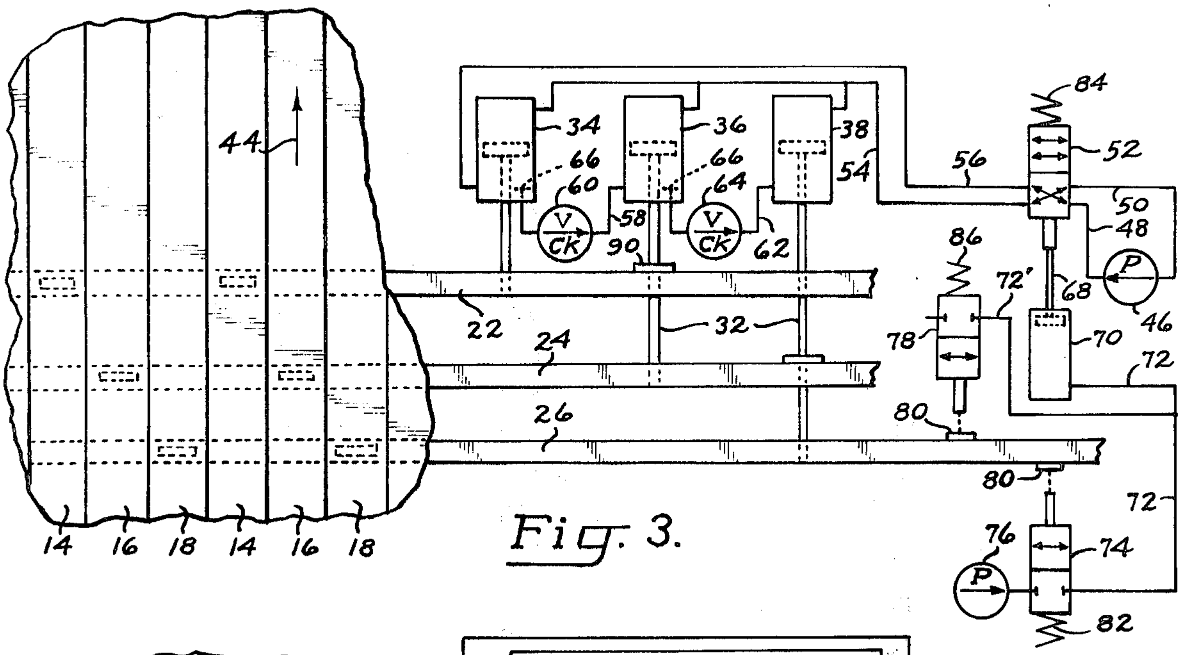
FIG. 3 is a schematic diagram of a fluid pressure drive system embodying the features of this invention, the same being operable to convey material in the direction of the arrow.

FIG. 3 of the drawings illustrates a fluid pressure system associated with the cylinders for effecting selective reciprocation of the pistons and piston rods to provide load conveying portion of the slats in the direction indicated by the arrow 44. This system includes a fluid pressure pump 46, preferably hydraulic, provided with outfeed conduit 48 and return conduit 50. A switching valve 52 functions to communicate said conduits 48 and 50 interchangeably with conduits 54 and 56. Conduit 54 communicates with the base end of each of the cylinders 34, 36 and 38, while conduit 56 communicates with the piston rod end of cylinder 34.

The piston rod end of cylinder 34 communicates freely with the piston rod end of cylinder 36 through conduit 58 and check valve 60. In similar manner, the piston rod end of cylinder 36 communicates freely with the piston rod end of cylinder 38 through conduit 62 and check valve 64. However, the check valves prevent fluid pressure flow in the direction opposite the flow direction indicated by the associated arrows until the piston rods 32 of the cylinders 34 and 36 become fully extended. When fully extended, the associated pistons engage a check valve operator 66 within the associated cylinder to switch the check valve to allow bidirectional flow.

As illustrated, switching valve 52 is connected at one end to the piston rod 68 of a fluid pressure cylinder 70, preferably pneumatic. The end of cylinder 70 opposite the piston rod 68 is connected by conduit 72 and valve 74 to the outlet of fluid pressure pump 76, which, preferably, is an air pump. Auxiliary conduit 72' communicates conduit 72 through vent valve 78 selectively with the atmosphere.

Valves 74 and 78 are positioned for selective actuation by drive beam 26. As illustrated, the valves are mounted in a fixed position below the plane of reciprocation of beam 26 and, through arms 80 depending from beam 26, are caused to be switched from the positions illustrated when beam 26 reaches the extremities of is reciprocating motion. Thus, when beam 26 reaches the position of full extension of the piston rod 32 associated with cylinder 38, valve 74 will be switched from the position illustrated, against the resilient resistance of its loading spring 82, to communicate pump 76 with conduit 72. In this condition fluid pressure is applied to cylinder 70 to cause extension of the position rod 68 and movement of switching valve 52 to the position illustrated, against the resilient resistance of its loading spring 84.

On the other hand, when drive beam 26 has been moved to the other extremity wherein the piston rod 32 associated with cylinder 38 is in its fully retracted position, valve 78 will be moved from the position illustrated, against the resilient resistance of its loading spring 86, to communicate conduit 72', and hence cylinder 70 to the atmosphere. The loading spring 84 there upon urges switching valve 52 to the alternate position.

In the position of the components illustrated in FIG. 3, drive beam 26 has just previously switched valve 74 from the position illustrated to allow pressurization of cylinder 70 from air pump 76 to effect switching of valve 52 to the position illustrated. In this position of the switching valve, fluid pressure from pump 46 is directed through conduits 48 and 56 to the piston rod end of cylinder 34 to initiate retraction of its associated piston rod and drive beam 22. Simultaneously, fluid pressure from conduit 56 passes through check valve 60 and conduit 58 into the piston rod end of cylinder 36 and through check valve 64 and conduit 62 into the piston rod end of cylinder 38.

From the foregoing it will be observed that switching of valve 52 of the drive system and reversal of movement of the conveyor slats is controlled positively by mechanism operated by some component associated with the slats when the latter reach their limits of reciprocative travel. In the embodiment illustrated, this mechanism includes the arms 80 on beam 26 and the check valve operators 66 associated with the pistons connected to beams 22 and 24, respectively.

By virtue of the foregoing sequence, all of the drive beams 22, 24 and 26 move substantially simultaneously in the same direction, i.e., in the direction of simultaneous retraction of piston rods 32 relative to their associated cylinders and consequent simultaneous movement of all of the slats in the conveying direction.

It is to be observed that fluid pressure flow from conduit 56 and cylinder 34 through check valves 60 and 64 and associated conduits may be restricted somewhat, depending in part upon the type of load being conveyed. If such restriction is excessive the piston rods of cylinders 34, 36 and 38 will retract in sequence, thereby rendering the conveying operation ineffective. Accordingly, means is provided to eliminate such sequential movement.

In the embodiment illustrated, this means is provided by abutments 90 and 92 secured to the piston rods 32 of cylinders 36 and 38, respectively. Abutment 90 is arranged to engage drive beam 22 in the fully extended position of the piston rods, and abutment 92 is arranged to engage drive beam 24 in said fully extended position of the piston rods. Thus, upon switching of valve 52 to the position illustrated, initial retraction of the piston rod of cylinder 34 will cause simultaneous initiation of retraction of the piston rod associated with cylinder 35, by virtue of engagement of the abutment 90 with drive beam 22, and initiation of retraction of the piston rod of cylinder 38 by engagement of abutment 92 with drive beam 24.

In any event, movement of all three drive beams and the associated elongated slats simultaneously in the conveying direction indicated by the arrow 44 continues until all of the piston rods 32 reach their limit of full retraction within their associated cylinders. At this position, all of the slats have been moved to their advanced position. Also, drive beam 26 has engaged and moved valve 78 from the position illustrated to open cylinder 70 to the atmosphere, whereby to shift switching valve 52 from the position illustrated to its alternate position, under the influence of loading spring 84.

In the switched position of valve 52, fluid pressure from pump 46 is communicated through conduits 48 and 54 to the base ends of cylinders 34, 36 and 38, while conduits 56 and 50 communicate the piston rod end of cylinder 34 with the exhaust side of the pump. Since the piston rod ends of cylinders 36 and 38 ar closed by virtue of check valves 60 and 64, only the piston rod of cylinder 34 is caused to extend.

Upon reaching its maximum limit of extension, the piston of cylinder 34 engages the operator 66 of check valve 60, switching the latter to allow fluid pressure flow from the piston rod end of cylinder 34 through condit 58, check valve 60 and conduits 56 an 50 back to the exhaust side of the pump. The piston rod associated with cylinder 36 thus is caused to extend.

Upon reaching its limit of extension, the piston of cylinder 36 engages the operator 66 of check valve 64, switching the latter to allow fluid flow from the piston rod end of cylinder 38 through conduit 62 and check valve 64, thence through conduit 58 and check valve 60, through conduits 56 and 50 to the exhaust side of the pump. The piston rod of cylinder 38 thus is caused to extend.

Upon reaching its limit of full extension, the piston rod of cylinder 38 will have moved the associated drive beam 26 into operative engagement with valve 74, switching the latter to communicate pump 76 with cylinder 70, thus to effect transfer of switching valve 52 once again to the position illustrated in FIG. 3, to effect simultaneous retraction of all piston rods 32 and consequent movement of all of the slats simultaneously in the conveying direction 44.

Figure 4:
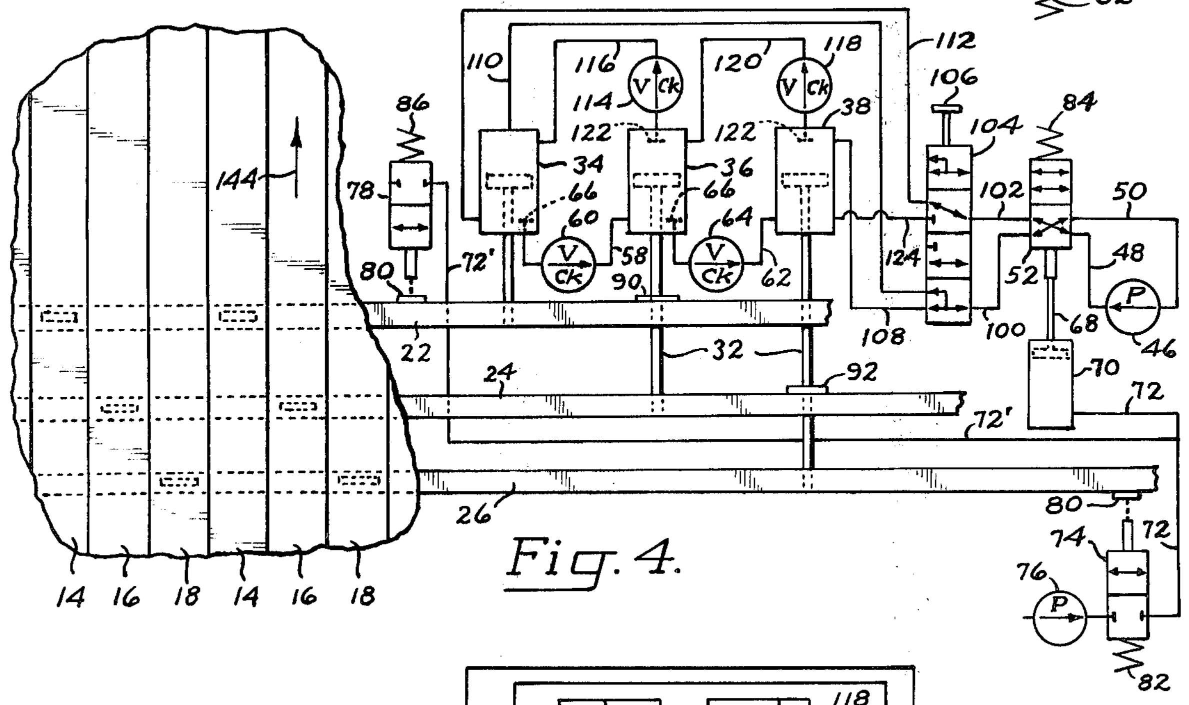
FIG. 4 is a schematic diagram of a second form of fluid pressure drive system which accommodates reversible operation of the conveyor, the drive system being shown adjusted to effect conveying material in the direction of the arrow.
Figure 5:
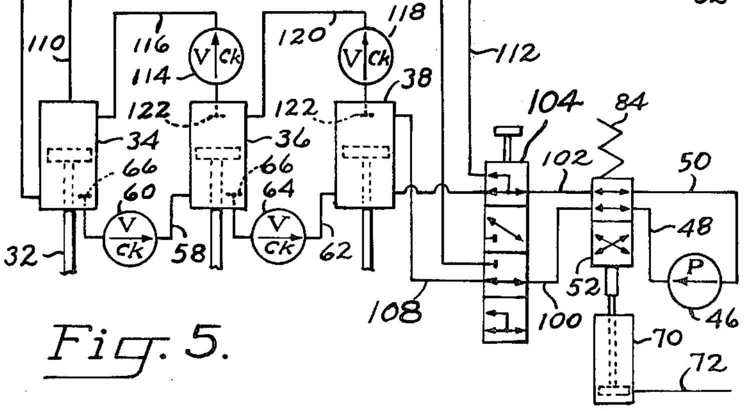
FIG. 5 is a schematic diagram of a portion of the fluid pressure drive system illustrated in FIG. 4, with the components being adjusted to effect reversal of the conveying direction.

The fluid pressure system illustrated in FIGS. 4 and 5 accommodates reversal of the direction of load conveying movement of the slats. For this purpose the fluid pressure system illustrated in FIG. 3 is modified as follows: The conduits 48 and 50 associated wth pump 46 are coupled interchangeably by switching valve 52 to conduits 100 and 102. These conduits lead to a reversing valve 104 which, in the embodiment illustrated, is operated manually as by means of handle 106.

In the position of reversing valve 104 illustrated in FIG. 4, conduit 100 communicates through conduit 108 with the base end of cylinder 38 and through conduit 110 with the base end of cylinder 34. The piston rod end of cylinder 34 communicates through conduit 112 and conduits 102 and 50 to the exhaust side of pump 46.

Further, the vent valve 78 for cylinder 70 is located for actuation by drive beam 22 such that when the piston rod associated with cylinder 34 is fully retracted, valve 78 is switched to communicate cylinder 70 to the atmosphere.

As in the embodiment illustrated in FIG. 3, the disposition of components illustrated in FIG. 4 represents an intermediate position of simultaneous retraction of the piston rods 32 and consequent simultaneous movement of all of the conveyor slats in the conveying direction 144. In this position fluid pressure from pump 46 is applied to the piston rod end of cylinder 34, through check valve 60 and conduit 58 to the piston rod end of cylinder 36, hence through check valve 64 and conduit 62 to the piston rod end of cylinder 38. The base end of cylinder 34 communicates through conduits 110, 100 and 50 to the exhaust side of pump 46. The base end of cylinder 36 communicates through check valve 114 and conduit 116 to the base end of cylinder 34, thence to conduits 110, 100 and 50 to the exhaust side of the pump. The base end of cylinder 38 communicates with the exhaust side of the pump either through check valve 118, conduit 120, check valve 114, conduit 116 and conduits 110 and 100, or directly through conduit 108.

Accordingly, all of the piston rods 32 move simultaneously in the retracting direction. As in the previous embodiment, the retracting movement of the piston rods may be sequential under certain conditions, and said sequential movement may be eliminated by use of the abutment 90 and 92, as previously explained.

When all piston rods are fully retracted, the arm 80 on drive beam 22 engages vent valve 78 and moves it to the open position, whereby to exhaust cylinder 70 to the atmosphere and cause switching valve 52 to move to the alternate position under the influence of loading spring 84. Fluid pressure from pump 46 thus is applied through conduit 100 and conduits 108 and 110 to the base ends of cylinders 38 and 34. Since the pistons of cylinders 36 and 38 are in the fully retracted position and have engaged the operators 122 of check valves 114 and 118 to allow bidirectional flow, fluid pressure also is applied through conduits 110, 116 and 120 to the base ends of cylinders 36 and 38.

However, only the piston rod end of cylinder 34 is connected through conduits 112, 102 and 50 to the exhaust side of the pump 46, whereupon the piston rod of cylinder 34 moves to its position of full extension. At this position the piston of cylinder 34 engages the operator 66 of check valve 60, whereupon the latter is operated to effect communication of the piston rod end of cylinder 36 through conduit 58 to the exhausting conduit 112.

The piston rod of cylinder 36 thereupon moves to its position of full extension, engaging the operator 66 of check valve 64 to operate the latter to communicate the piston rod end of cylinder 38 through conduits 62 and 58 to the exhausting conduit 112. The piston rod of cylinder 38 thus moves to its position of full extension, whereupon the arm 80 on drive beam 26 engages valve 74 and moves it to the position in which the outlet of pump 76 communicates with cylinder 70, effecting transfer of the switching valve 52 back to the position illustrated in FIG. 4. As previously explained, all of the piston rods thereupon move simultaneously in the retracting direction of load conveying movement 144.

If it is desired to reverse the load conveying direction from the direction 144 in FIG. 4, reversing valve 104 is moved to the position illustrated in FIG. 5. The illustrated disposition of components has resulted from full retraction of the piston rod 32 of cylinder 34 with consequent switching of valve 78 to open cylinder 70 to the atmosphere and allow switching valve 52 to move to the position illustrated in FIG. 5 under the influence of loading spring 84. In this position of the switching valve, fluid pressure from pump 46 is communicated through conduits 48, 100 and 108 to the base end of cylinder 38, thence through check valves 118 and 114 and associated conduits to the base ends of cylinders 36 and 34.

Extension of the piston rods is accommodated by conduit 124 which communicates the piston rod end of cylinder 38 through conduits 102 and 50 to the exhaust side of pump 46. The piston rod ends of cylinders 34 and 36 also communicate with conduit 124 through the check valves 60 and 64 and associated conduits 58 and 62.

The foregoing simultaneous extension of the piston rods, and hence of all of the slats, may be insured by provision of the abutments 90 and 92, as previously described. Thus, since the abutment 92 on the piston rod 32 of cylinder 38 is in engagement with the drive beam 24, and since the piston rod 32 of cylinder 36 carries the abutment 90 in engagement with the drive beam 22, it will be understood that extension of the piston rod of cylinder 38 effects simultaneous extension of the piston rods of cylinder 36 and 34, with consequent simultaneous movement of all of the conveyor slats in the load conveying direction opposite the arrow 144 in FIG. 4.

When the piston rods reach their positions of full extension, the arm 80 on drive beam 26 engages valve 74 and switches it to the position in which pump 76 communicates with cylinder 70 to move the switching valve 52 to the alternate position. Fluid pressure from pump 46 thus communicates through conduits 48, 102, 112 and 124 to the piston rod ends of cylinders 34 and 38. Fluid pressure also is supplied to the piston rod end of cylinder 36 through reversed check valve 64.

However, only the base end of cylinder 38 is connected to the exhaust side of pump 46, through conduits 108, 100 and 50, and therefore only the piston rod of cylinder 38 moves to its position of full retraction where it engages the operator 122 of check valve 118 to operate the latter and thus communicate the base end of cylinder 36 with the exhausting conduit 108 through check valve 118 and conduit 120.

The piston rod of cylinder 36 thereupon moves to its position of full retraction, the piston rod end of cylinder 36 being supplied with fluid under pressure through conduits 112 and 58, since the piston of cylinder 36 has been retracted sufficiently to disengage the operator 66 of check valve 60.

Upon reaching its position of full retraction within cylinder 36, the associated piston engages the operator 122 of check valve 114, thereby communicating the base end of cylinder 34 to the exhaustion conduit 108 through conduits 116 an 120 and associated check valves 112 and 118.

Upon reaching its position of full retraction within cylinder 34, the associated drive beam 22 engages vent valve 78 and switches it to exhaust cylinder 70 to the atmosphere and thus return switching valve 52 to the position illustrated in FIG. 5. This initiates simultaneous extension o all of the piston rods and consequent simultaneous movement of all of the conveyor slats in the conveying direction opposite the direction of arrow 144 in FIG. 4.

From the foregoing it will be appreciated that the present invention provides a reciprocation slat-type conveyor which functions efficiently to move all types of loads in a desired conveying direction. Moreover, the conveyor includes a fluid pressure drive system composed of commercially available components. The cost of manufacture, maintenance and repair thus is reduced to a minimum.

It will be apparent to those skilled in the art that various changes may be made in the size, shape, type, number and arrangement of parts described hereinbefore without departing from the spirit of this invention.

Having now described my invention and the manner in which it may be used, I claim:

1. A reciprocation conveyor, comprising:

(a) a frame, (b) at least three elongated slat members mounted adjacent each other on the frame for independent longitudinal reciprocation in a single plane between start and advanced positions, (c) a plurality of reversible hydraulic drive means one for each slat member, the plurality of drive means interconnecting the frame and the associated slat members for moving all of the slat members from the start position simultaneously in a conveying direction to the advanced position and returning the slat members one at a time back from the advanced position to said start position, and (d) drive control means engaging the plurality of drive means and operable when all of the slat members reach their limit of advanced position to effect reversing the plurality of drive means one at a time for returning the slat members one at a time back to said start position and operable when all of the slat members reach their limit of retraction to said start position to effect reversing the drive means for moving all of the slat members simultaneously in said conveying direction.

2. A reciprocation conveyor, comprising:

(a) a frame, (b) at least one group of at least three elongated slat members mounted adjacent each other on the frame for longitudinal reciprocation between start and advanced positions, (c) reversible drive means interconnecting the frame and each slat member for moving all of the slat members of each group from the start position simultaneously in a conveying direction to the advanced position and returning the slat members of each group sequentially back from the advanced position to said start position, the drive means comprising:

(1) an extensible fluid pressure piston-cylinder unit for each slat member of a group, each unit being connected at one end to the frame and at the opposite end to the associated slat member for reciprocating the latter, (2) a source of fluid pressure, and (3) adjustable valve means for connecting the source of fluid pressure to the piston-cylinder units and operable in a first position of adjustment to apply fluid pressure to the piston-cylinder units to effect simultaneous movement of all slat members from the start position in the load-conveying direction to the advanced position, and operable in a second position of adjustment to apply fluid pressure to the piston-cylinder units to effect sequential movement of the slat members of each group back from said advanced position to said start position, and (d) drive control means engaging the drive means and operable when the slat members of each group reach their limit of advanced position to effect reversing the drive means for returning the slat members sequentially to said start position and operable when the slat members of each group reach their limit of retraction to said stat position to effect reversing the drive means for moving the slat members simultaneously in said conveying direction, the drive control means including valve adjustment means operative at said start and advanced position of the slat members to adjust the valve means to said first and second positions, respectively, the valve adjustment means comprising a fluid pressure piston-cylinder unit operatively engaging said valve means, a source of fluid pressure for said unit, and second valve means operable at said start and advanced positions for communicating said unit selectively with said source of fluid pressure and with exhaust.

3. The reciprocating conveyor of claim 2 wherein the second valve means are operable at said start and advanced positions, respectively, for communicating said valve adjustment piston-cylinder unit selectively with said source of fluid pressure and exhaust, and the adjustable valve means is interposed between the valve adjustment piston-cylinder unit and the piston-cylinder units of the slat members for selectively changing the conveying direction of the conveyor.

4. A reciprocating conveyor, comprising:

(a) a frame.

(b) at least one group of at least three elongated slat members mounted adjacent each other on the frame for longitudinal reciprocation between start and advanced positions, (c) reversible drive means interconnecting the frame and each slat member for moving all of the slat members of each group from the start position simultaneously in a conveying direction to the advanced position and returning the slat members of each group sequentially back from the advanced position to said start position, the drive means comprising:

(1) an extensible fluid pressure piston-cylinder unit for each slat member of a group, each unit being connected at one end to the frame and at the opposite end to the associated slat member for reciprocating the latter, (2) a source of fluid pressure and (3) adjustable valve means for connecting the source of fluid pressure to the piston-cylinder units and operable in a first position of adjustment to apply fluid pressure to the piston-cylinder units to effect simultaneous movement of all slat members from the start position in the load-conveying direction to the advanced position, and operable in a second position of adjustment to apply fluid pressure to the piston-cylinder units to effect sequential movement of the slat members of each group back from said advanced position to said start position, (d) drive control means engaging the drive means and operable when the slat members of each group reach their limit of advanced position to effect reversing the drive means for returning the slat members sequentially to said start position and operable when the slat members of each group reach their limit of retraction to said start position to effect reversing the drive means for moving the slat members simultaneously in said conveying direction, and (e) abutment means operatively interengaging the fluid pressure piston cylinder units in said start position and during movement to said advanced position for insuring said simultaneous movement of all slat members in the conveying direction.

* * * * *

UNITED STATES PATENT AND TRADEMARK OFFICE

CERTIFICATE OF CORRECTION

PATENT NO. : 4,143,760
DATED : March 13, 1979
INVENTOR(S) : Olof A. Hallstrom

It is certified that error appears in the above—identified patent and that said Letters Patent is hereby corrected as shown below:

The term of this patent subsequent to March 20, 1996 has been disclaimed.

Signed and Sealed this

*Twenty-sixth* Day of *February 1980*

[SEAL]

*Attest:*

SIDNEY A. DIAMOND

*Attesting Officer* *Commissioner of Patents and Trademarks*

// REEXAMINATION CERTIFICATE (1413th)
United States Patent [19]

[11] B1 4,143,760

Hallstrom

[45] Certificate Issued Feb. 5, 1991

[54] RECIPROCATING CONVEYOR

[76] Inventor: Olof A. Hallstrom, 1350 Hallstrom Rd., Tillamook, Oreg. 97141

Reexamination Request:
No. 90/001,907, Dec. 13, 1989

Reexamination Certificate for:

| | |
|---|---|
| Patent No.: | **4,143,760** |
| Issued: | **Mar. 13, 1979** |
| Appl. No.: | **707,877** |
| Filed: | **Jul. 22, 1976** |

Certificate of Correction issued Feb. 26, 1980.

Related U.S. Application Data

[63] Continuation of Ser. No. 540,281, Jan. 10, 1975, abandoned.

[51] Int. Cl.$^5$ .......... B65G 25/04
[52] U.S. Cl. .......... 198/750; 198/775; 414/525.1
[58] Field of Search .......... 414/525.1

[56] References Cited

U.S. PATENT DOCUMENTS

| | | | |
|---|---|---|---|
| 2,891,755 | 6/1959 | Pearne | 254/2 |
| 3,146,678 | 9/1964 | Strick . | |
| 3,530,895 | 9/1970 | Rothrock . | |
| 3,534,875 | 10/1970 | Hallstrom . | |
| 3,620,125 | 11/1971 | Fuhrimann | 91/280 |
| 3,809,248 | 5/1974 | Ohniwa et al. | 212/55 |
| 3,905,290 | 9/1975 | Caughey . . | |

FOREIGN PATENT DOCUMENTS 6706657 11/1968 Netherlands .

OTHER PUBLICATIONS

Dr. Techn. Heinz Zoebl, *Fundamentals of Hydraulic Circuitry*, published in 1970, Cover page, Copyright page, Contents, and pp. 124–131.
Sperry Vickers, *Mobile Hydraulics Manual M-2990-S*, 7th Printing dated 1973, Cover page, copyright page, and pp. 10, 11, 64 and 65.
Charles S. Hedges, *Industrial Fluid Power, vol. 1*, 5th Printing dated 1967, Cover page, Table of Contents, and pp. 40 and 47.
D. McCloy and H. R. Martin, *The Control of Fluid Power*, 1973, Cover page, copyright page, and pp. 254–256.
Harry L. Stewart, *Hydraulic and Pneumatic Power for Production*, 2nd Edition 1963, Cover page, copyright page, and Chapter 19, pp. 19–1 thru 19–17, and Chapter 20, pp. 20–1 thru 20–15.

*Primary Examiner*—D. Glenn Dayoan

[57] ABSTRACT

At least one group of at least three elongated slats are mounted side-by-side on a frame for longitudinal reciprocation to form a conveyor, the slats being connected to a fluid pressure drive mechanism which is operable to move all of the slats of each group from a start position simultaneously in a load-conveying direction and then to move the slats of each group sequentially in the opposite direction from the advanced position back to the start position, the slats of each group being interengaged releasably in the conveying direction to insure simultaneous movement.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 4 is confirmed.

Claims 1 and 2 are determined to be patentable as amended.

Claim 3 dependent on an amended claim, is determined to be patentable.

1. A reciprocation conveyor, comprising:

(a) a frame, (b) at least three elongated slat members mounted adjacent each other on the frame for independent longitudinal reciprocation in a single plane between start and advanced positions, (c) a plurality of reversible hydraulic drive means one for each slat member, the plurality of drive means interconnecting the frame and the associated slat members for moving all of the slat members from the start position simultaneously in a conveying direction to the advanced position and returning the slat members one at a time back from the advanced position to said start position, [and]

(d) drive control means engaging the plurality of drive means and operable when all of the slat members reach their limit of advanced position to effect reversing the plurality of drive means one at a time for returning the slat members one at a time back to said start position and operable when all of the slat members reach their limit of retraction to said start position to effect reversing the drive means for moving all of the slat members simultaneously in said conveying direction, *and*

*(e) abutments operatively interengaging the plurality of drive means in said start position and during movement to said advanced position for insuring said simultaneous movement of all slat members in the conveying direction.*

2. A reciprocation conveyor, comprising:

(a) a frame, (b) at least one group of at least three elongated slat members mounted adjacent each other on the frame for longitudinal reciprocation between start and advanced positions, (c) reversible drive means interconnecting the frame and each slat member for moving all of the slat members of each group from the start position simultaneously in a conveying direction to the advanced position and returning the slat members of each group sequentially back from the advanced position to said start position, the drive means comprising:

(1) an extensible fluid pressure piston-cylinder unit for each slat member of a group, each unit being connected at one end to the frame and at the opposite end to the associated slat member for reciprocating the latter, (2) a source of fluid pressure, and (3) adjustable valve means for connecting the source of fluid pressure to the piston-cylinder units and operable in a first position of adjustment to apply fluid pressure to the piston-cylinder units to effect simultaneous movement of all slat members from the start position in the load-conveying direction to the advanced position, and operable in a second position of adjustment to apply fluid pressure to the piston-cylinder units to effect sequential movement of the slat members of each group back from said advanced position to said start position, and (d) drive control means engaging the drive means and operable when the slat members of each group reach their limit of advanced position to effect reversing the drive means for returning the slat members sequentially to said start position and operable when the slat members of each group reach their limit of retraction to said stat position to effect reversing the drive means for moving the slat members simultaneously in said conveying direction, the drive control means including valve adjustment means operative at said start and advanced position of the slat members to adjust the valve means to said first and second positions, respectively, the valve adjustment means comprising a fluid pressure piston-cylinder unit operatively engaging said valve means, a source of fluid pressure for said unit, and second valve means operable at said start and advanced positions for communicating said unit selectively with said source of fluid pressure and with exhaust, *and*

*(e) at least two abutment surfaces positioned adjacent a first and a second of the three slat members, respectively, such that movement of the third of the three slat members in the load-conveying direction causes movement of the second of the three slat members in the load-conveying direction, which causes movement of the first of the three slat members in the load-conveying direction, thereby insuring said simultaneous movement of all slat members in the conveying direction.*

* * * * *